US009617038B2

(12) United States Patent
Yagishita et al.

(10) Patent No.: US 9,617,038 B2
(45) Date of Patent: Apr. 11, 2017

(54) CONTAINER INCLUDING AN INLET HAVING AN IC CHIP AND AN ANTENNA FOR MONITORING TAMPER EVENTS OF THE CONTAINER

(71) Applicant: Toppan Printing Co., Ltd., Taito-ku, Tokyo (JP)

(72) Inventors: Toshiaki Yagishita, Taito-ku (JP); Takamitsu Nakabayashi, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/827,999

(22) Filed: Aug. 17, 2015

(65) Prior Publication Data
US 2015/0353234 A1     Dec. 10, 2015

Related U.S. Application Data

(63) Continuation of application No. PCT/JP2014/053858, filed on Feb. 19, 2014.

(30) Foreign Application Priority Data

Feb. 19, 2013   (JP) ................................. 2013-029746

(51) Int. Cl.
*G08B 13/14*   (2006.01)
*B65D 25/02*   (2006.01)
(Continued)

(52) U.S. Cl.
CPC ......... *B65D 25/02* (2013.01); *B65D 55/0818* (2013.01); *B65D 55/0854* (2013.01);
(Continued)

(58) Field of Classification Search
CPC .......... G06Q 20/207; G06K 19/07758; G06K 19/07798; B65D 55/02; B65D 25/02
(Continued)

(56) References Cited

U.S. PATENT DOCUMENTS 6,050,622 A      4/2000  Gustafson
6,641,052 B2 *  11/2003  Choko ............... B65D 39/0011
                                                40/311
(Continued)

FOREIGN PATENT DOCUMENTS

JP    H06-511579 A   12/1994
JP    2001-256575 A   9/2001
(Continued)

OTHER PUBLICATIONS

International Search Report dated Apr. 8, 2014 issued in Application No. PCT/JP2014/053858.

*Primary Examiner* — Eric M Blount
(74) *Attorney, Agent, or Firm* — Foley & Lardner LLP (57) ABSTRACT

This container includes a container main body, an inlet including a substrate, an IC chip and an antenna, and a covering film that covers a part of an outer surface of the container main body and has a brittle part. The brittle part is a part easily torn by an external force than parts other than the brittle part in the covering film. At least a part of the inlet is positioned between the covering film and the outer surface of the container main body and adhered to the covering film. The brittle part covers at least a part of the antenna.

7 Claims, 6 Drawing Sheets

(51) Int. Cl.
*G06K 19/077* (2006.01)
*B65D 55/08* (2006.01)

(52) U.S. Cl.
CPC . *G06K 19/07758* (2013.01); *G06K 19/07798* (2013.01); *B65D 2101/00* (2013.01); *B65D 2203/10* (2013.01)

(58) Field of Classification Search
USPC ............. 340/572.8; 206/216; 292/307 R
See application file for complete search history.

(56) References Cited

U.S. PATENT DOCUMENTS

| | | | | |
|---|---|---|---|---|
| 6,888,509 | B2 * | 5/2005 | Atherton | G06K 19/073 235/492 |
| 7,034,689 | B2 * | 4/2006 | Teplitxky | B65D 55/06 340/572.1 |
| 7,364,089 | B2 * | 4/2008 | Claessens | B65D 55/02 235/375 |
| 7,876,221 | B2 * | 1/2011 | Tanaka | G06K 19/073 340/539.1 |
| 8,368,539 | B2 * | 2/2013 | Adstedt | B65D 55/028 340/572.1 |
| 8,444,058 | B2 * | 5/2013 | Masin | G06K 19/07758 235/375 |
| 8,783,579 | B2 * | 7/2014 | Chang | G06K 19/07798 235/385 |
| 8,854,213 | B2 * | 10/2014 | Adstedt | B65D 39/00 340/500 |
| 2005/0128087 | A1 | 6/2005 | Claessens et al. | |
| 2007/0139205 | A1 * | 6/2007 | Tanaka | G06K 19/073 340/572.8 |
| 2007/0296599 | A1 * | 12/2007 | Wang | B65D 55/028 340/572.8 |
| 2009/0212954 | A1 * | 8/2009 | Adstedt | B65D 39/00 340/572.8 |
| 2012/0217244 | A1 * | 8/2012 | Phaneuf | B65D 53/04 220/212 |

FOREIGN PATENT DOCUMENTS

| | | |
|---|---|---|
| JP | 2006-227037 A | 8/2006 |
| JP | 2006-227670 A | 8/2006 |
| JP | 2007-533562 A | 11/2007 |
| JP | 04-220184 B2 | 2/2009 |
| JP | 2009-075712 A | 4/2009 |
| JP | 05-035041 B2 | 9/2012 |

* cited by examiner

CONTAINER INCLUDING AN INLET HAVING AN IC CHIP AND AN ANTENNA FOR MONITORING TAMPER EVENTS OF THE CONTAINER

CROSS REFERENCE TO RELATED APPLICATIONS

This application is an application filed under 35 U.S.C. 111(a) claiming the benefit under 35 U.S.C. §§120 and 365(c) of PCT International Application No. PCT/JP2014/053858 filed on Feb. 19, 2014, which is based upon and claims the benefit of priority of Japanese Application No. 2013-029746 filed on Feb. 19, 2013, the entire contents of both are hereby incorporated by reference in their entireties.

TECHNICAL FIELD

The technology of the present disclosure relates to a container including an inlet having an IC chip and an antenna.

BACKGROUND ART

Figure 18:
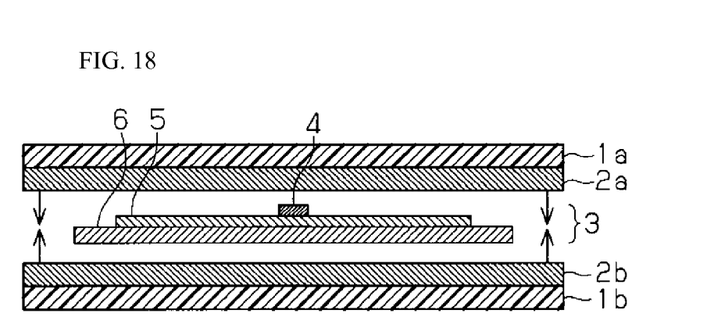
FIG. 18 is a sectional view showing a sectional structure of a conventional IC tag label.

An inlet provided in an RFID tag includes an IC chip for storing information that can be read by short distance wireless communication. As shown in FIG. 18, a front face of an inlet 3 is covered with a protective sheet 1a via a first adhesive layer 2a, and a reverse face of the inlet 3 is covered with a protective sheet 1b via a second adhesive layer 2b. The inlet 3 includes an antenna 5 that transmits and receives electromagnetic waves, an IC chip 4 connected to the antenna 5, and a substrate 6 on which the antenna 5 and the IC chip 4 are aligned. When the protective sheets 1a and 2b cover the inlet 3, the first adhesive layer 2a and the second adhesive layer 2b are laminated in a direction indicated by arrows in FIG. 18. Frequency bands that can communicate with small antennas, such as the 900 MHz band, the 2.45 GHz band, or the 5.8 GHz band, are used for a communication frequency of the antenna, and a communicable distance is about from some tens of centimeters to one meter. Further, because energy for driving the IC chip is radiated as electromagnetic waves from a reader close to the antenna 5, a battery that functions as an energy source is not built in the inlet. Therefore, the RFID tag is used semi-permanently as long as the inlet 3 is not destroyed.

The RFID tag is incorporated in a card for managing room entry and exit, for example, or stuck to various articles or cases to be distributed in the market as an IC tag label for the purpose of shoplifting prevention, authenticity determination, history management, distribution management, inventory management, or the like. The IC tag label is, for example, attached to a sealing sticker that is stuck to a fold or a closed part of a cardboard or a sealed bag, or to a sealing sticker that is stuck to a closed part of a housing of electronic equipment. Further, the IC tag label is, for example, attached to a periphery of a lid or a stopper of a container which is a bottle that accommodates, for example. liquor, wine, jam, dressing, sauce, spices, and the like, or a plastic container. In order to indicate that the stopper is unopened or the lid is unopened in these containers, a technology where a part or whole of a lid or stopper and sides of the container are covered by a shrink film is used. As a technology for combining a shrink film and an IC tag label, a technology in which an IC tag label is incorporated into a top sheet that is placed on an opening formed to a container, and a periphery of the top sheet is fixed by shrink film that is formed in a frame shape is disclosed (refer to Patent Document 1, for example).

On the other hand, the IC tag label finishes serving as a label when an article to which the IC tag label is attached is delivered to a user. In this case, because the function of the RFID tag is still maintained, there is a possibility that the IC tag label may be peeled off and diverted, information that the IC chip has is read, or information that the IC chip has is tampered with. Therefore, it is preferable that the IC tag label has constant strength and rigidity during a period being attached to an article, and the function of the RFID tag is lost when being removed from the article (refer to Patent Documents 2 and 3, for example).

PRIOR ART

Patent Document

[Patent Document 1] Japanese Patent Publication No. 4220184
[Patent Document 2] Japanese Patent Application Laid-Open Publication No. 2009-75712
[Patent Document 3] Japanese Patent Publication No. 5035041

DISCLOSURE OF THE INVENTION

Problems to be Improved by the Invention

The technology of the present disclosure has its object to provide a container with an inlet in which the communication function of an antenna is easily lost by an external force.

Means for Solving the Problems

In one aspect of a container in a technology of the present disclosure includes a container main body, an inlet having an IC chip supported by a substrate and an antenna supported by the substrate, and a covering film that covers a part of an outer surface of the container main body and has a brittle part, the brittle part being a part more easily torn by external force than or compared to parts other than the brittle part in the covering film, at least a part of the inlet being positioned between the covering film and the outer surface of the container main body and adhered to the covering film, and the brittle part covers at least a part of the antenna.

According to the above configuration, when the covering film receives an external force for tearing the covering film, the covering film is torn along the brittle part, and the inlet is destroyed with the covering film. At this time, because the brittle part of the covering film covers at least a part of the antenna, the antenna is destroyed when the inlet is destroyed with the covering film. Accordingly, because the external force that tries to peel off the covering film is effectively used for destroying the antenna, the communication function of the antenna can be easily destroyed.

In another aspect of the container in the technology of the present disclosure, it is preferable that the container includes a lid for closing an opening formed in the container main body, and the inlet and the covering film are positioned extending over the outer surface of the container main body and the lid.

According to the above configuration, unauthorized acts such as replacing the contents of the container main body by removing the lid are suppressed from being performed.

In another aspect of the container in the technology of the present disclosure, it is preferable that the substrate is a paper.

According to the above configuration, because the substrate of the inlet is easily torn, the inlet becomes easily destroyed along with the covering film.

In another aspect of the container in the technology of the present disclosure, it is preferable that the brittle part is a first brittle part, the substrate includes a second brittle part and the second brittle part being a part more easily torn by external force than parts other than the second brittle part in the substrate, and the first brittle part covers at least a part of the second brittle part.

According to the above configuration, because the part of the covering film and the part of the inlet that are easily torn by the external force overlap, the inlet becomes easily destroyed with the covering film.

In another aspect of the container in the technology of the present disclosure, it is preferable that there is provided a supporting member that supports the antenna, the supporting member has an overhanging portion overhanging from the outer surface of the container main body along a direction intersecting the outer surface of the container main body, and includes the overhanging portion as a portion for supporting the antenna.

According to the above configuration, because a part of the antenna is positioned at a position apart from the outer surface of the container main body, it is possible to suppress the communication from being influenced by a liquid even when the contents of the container main body include a liquid.

In another aspect of the container in the technology of the present disclosure, it is preferable that the container main body accommodates a content including a liquid, and a portion within the inlet positioned between the covering film and the outer surface of the container main body is positioned above a liquid level of the liquid when the container main body is at rest.

According to the above configuration, because the antenna is suppressed from facing the liquid through the container main body, it is possible to more appropriately suppress the communication from being influenced.

In another aspect of the container in the technology of the present disclosure, the container may include a buffer member attached to the container main body that has a portion positioned between the outer surface of the container main body and the inlet.

According to the above configuration, because the outer surface of the container main body and the inlet are separated by an interposition of the buffer member, it is possible to suppress the communication from being influenced by the liquid even when the contents of the container main body include the liquid.

In another aspect of the container in the technology of the present disclosure, it is preferable that the container main body has an edge portion surrounding the opening formed in the container main body, and the edge portion is fitted to the buffer member.

According to the above configuration, it is possible to attach the buffer members easily to the container main body

MODE FOR CARRYING OUT THE INVENTION

First Embodiment

A first embodiment of a container will be described with reference to FIGS. 1-9. First, a configuration of an inlet will be described with reference to FIGS. 1 and 2.

Figure 1:
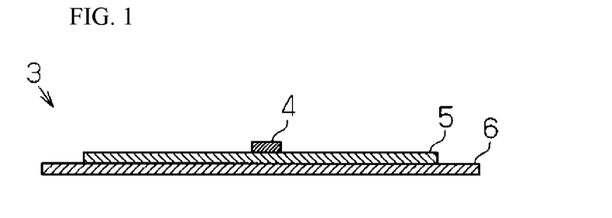
FIG. 1 is a sectional view showing a sectional structure of an inlet included in a container of first to third embodiments in the present disclosure.

As shown in FIG. 1, an inlet 3 is an electronic member that has a communication function of an RFID tag, and includes a substrate 6, an antenna 5 supported by the substrate 6, and an IC chip 4 supported by the substrate 6.

A material constituting the substrate 6 may be a resin film such as polyethylene terephthalate (PET), polyethylene naphthalate (PEN), or polyimide, or may be a paper such as fine paper, art paper, or coated paper may even, or may be a synthetic paper. The synthetic paper is a sheet having porosity with holes finely dispersed in synthetic resin, and a solid and a gas are unevenly dispersed. The synthetic resin contained in the synthetic paper is, for example, a PET or polypropylene (PP), such as foaming PET. The thickness of the substrate 6 is about 50 μm, for example.

Plasticizers such as kaolin or calcium carbonate may be further dispersed in the above-mentioned film or paper for the purpose of increasing brittleness in the material constituting the substrate 6. Paper has a high brittleness compared to the film because paper is easily torn. Therefore, it is preferable that the material constituting the substrate 6 is a paper in the respect that a high brittleness can be obtained. Meanwhile, in a case where a use of paper is difficult in an environment where the inlet is used 3, it is preferable that the material constituting the substrate 6 is a film, or a synthetic paper having porosity.

The size of the IC chip 4 is, for example, 0.05 mm square-0.5 mm square, and the thickness of the IC chip 4 is, for example, 0.1 mm.

Incidentally, the IC chip 4 may be, for example, a chip main body, or may be a module including the chip main body and a printed circuit board having a wiring that connects the chip main body and an outside.

Although it is preferable that communication frequency is a 900 MHz (UHF), it is not limited to this band, and may be a VHF band and GHz band, for example, depending on the use of the inlet 3.

Figure 2:
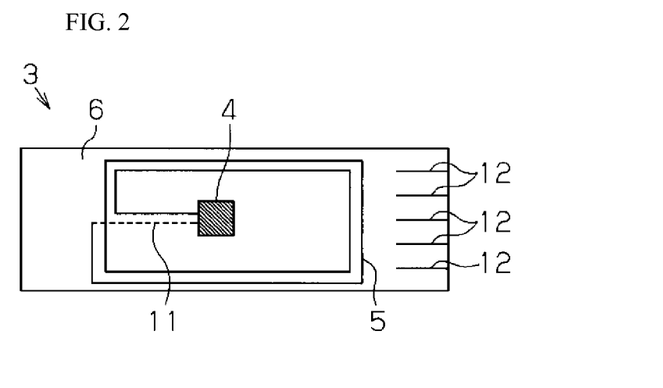
FIG. 2 is a plan view showing a planar structure of the inlet included in the container of the first and third embodiment.

As shown in FIG. 2, the IC chip 4 is connected to the antenna 5. The antenna 5 includes, for example, a single conductor line having a width of about 10 μm as a transmission line, and the conductor line has a loop shape that is drawn a plurality of times on a surface of the substrate 6, for example. When the conductor line has a portion that intersects three-dimensionally to each other, the portion that intersects three-dimensionally is composed of a through-hole and a jumper wire 11 positioned on a reverse face of the substrate 6, for example. Two ends that the single conductor line has are respectively led to a front face of the substrate 6. The two ends that the single conductor line has are connected separately to two pads located on the front face of the substrate 6, and two terminals that the IC chip 4 has are also connected separately to the two pads. Between the IC chip 4 and the pads, and between the antenna 5 and the pads may be connected by solder, or may be connected by a binder containing metal particles such as an anisotropic conductive paste (ACP) or anisotropic conductive film (ACF).

A method of forming the conductor line provided in the antenna 5 varies depending on the material constituting the substrate 6. When the substrate 6 is a film, for example, the conductor line provided in the antenna 5 may be formed by first laminating conductive foils such as aluminum foil or copper foil having a thickness of several μm on a front face of the film, and by then etching the conductive foils. When the substrate 6 is a paper, for example, the method of forming the conductor line provided in the antenna 5 uses a printing method using a conductive paste instead of etching described above. That is, the binder resin, a solvent, and a conductive paste containing a conductive powder are first printed along a shape of the conductor line, and the conductor line provided in the antenna 5 is obtained after the print dries. The conductive powder contained in the conductive paste is a powder composed of a metal such as silver, copper, nickel, gold, platinum, etc., or a powder made of a conductive material such as conductive carbon. It should be noted that it is preferable that the conductive material contained in the conductive paste is a silver based material in the respect that a high conductivity may be obtained. A printing method is, for example, screen printing, flexographic printing, gravure printing, offset printing or the like.

It is preferable that second brittle parts 12 each having a linear shape extending from an end of the front face of the substrate 6 toward a center are formed in portions where a formation of the antenna 5 and the IC chip 4 on the front face of the substrate 6 is not inhibited. The second brittle parts 12 are parts more easily broken by external force than parts other than the second brittle parts 12 in the substrate 6. The second brittle parts 12 may include a slit that is a hole extending along one direction, or may include a perforation that is a plurality of holes disposed intermittently along one direction, for example. Further, the second brittle parts 12 may have a structure that a portion of the substrate 6 thinner than a portion other than the second brittle part 12 is continuous or intermittently aligned along one direction, and it may be a part having a structure with partially lower strength against the external force in the substrate 6. In particular, when a film or synthetic paper is used as the substrate 6, it is preferable that the substrate 6 has the second brittle parts 12.

The antenna 5 is positioned on extended lines of the second brittle parts 12 in the front face of the substrate 6. The number of the second brittle part 12 is not limited, and the second brittle part 12 may have a linear shape extending from one side of four sides that the substrate 6 has to the center of the front face of the substrate 6, for example, or may have a linear shape extending from each of two sides facing each other of the four sides that the substrate 6 has to the center of the front face of the substrate 6. Moreover, the second brittle part 12 may have a linear shape, or may have a curved shape, or a shape that the second brittle part 12 has may be a combination of a linear shape and a curved shape.

When the external force acts on the substrate 6, the second brittle part 12 exerts a function of inducing a location where the substrate 6 is torn at the second brittle part 12. Then, when the external force acts on the substrate 6, the substrate 6 can be easily torn from where the second brittle part 12 is provided in the substrate 6 along a direction that the second brittle part 12 extends.

Figure 3:
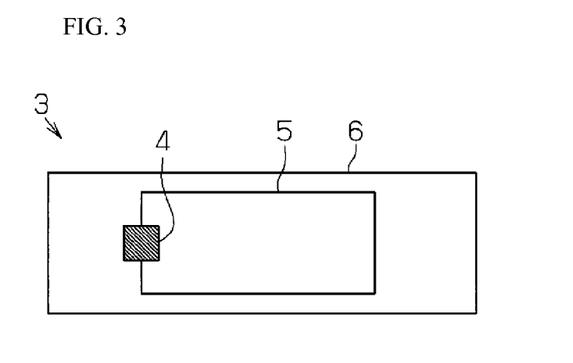
FIG. 3 is a plan view showing a modified example of a configuration of an antenna in the inlet included in the container of the first and third embodiments.

Incidentally, the conductor line provided in the antenna 5 may have the following shapes, and a transmission method in the antenna 5 may be the following method. As shown in FIG. 3, the conductor line provided in the antenna 5 has a single loop-shape, and the antenna 5 may function as a loop antenna.

Figure 4:
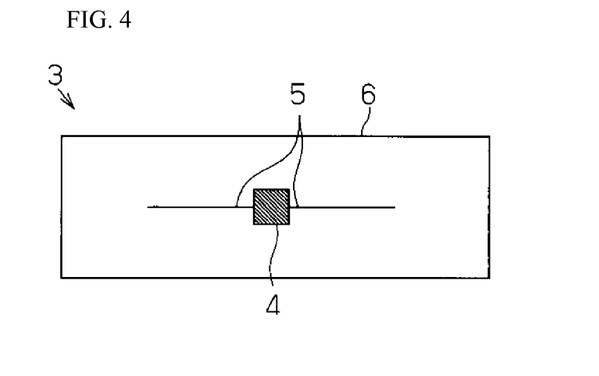
FIG. 4 is a plan view showing a modified example of a configuration of an antenna in the inlet included in the container of the first and third embodiments.

As shown in FIG. 4, the conductor line provided in the antenna 5 has a linear shape extending bidirectionally from the IC chip 4, and the antenna 5 may function as a dipole antenna. In addition, when the antenna 5 functions as a dipole antenna, the conductor line may have a bent line shape or may have a spiral shape for the purpose of lengthening the substantial antenna length.

Figure 5:
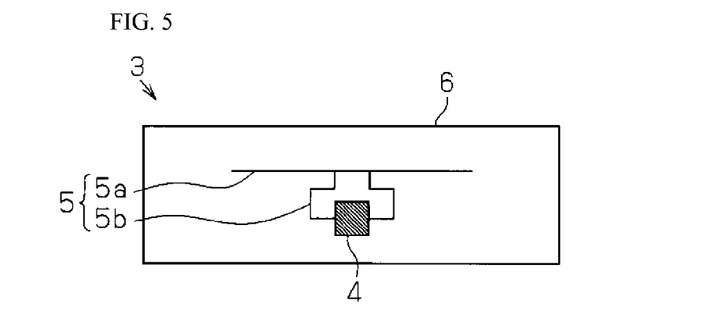
FIG. 5 is a plan view showing a modified example of a configuration of an antenna in the inlet included in the container of the first and third embodiments.

As shown in FIG. 5, when the antenna 5 functions as a dipole antenna, the antenna 5 may be composed of a radiating element 5*a* that is a conductor line functions as a radiation element, and a matching circuit 5*b* that is a conductor line functions as a matching circuit for adjusting electrical characteristics such as impedance. In the example shown in FIG. 5, the radiating element 5*a* and the matching circuit 5*b* are connected to each other.

Figure 6:
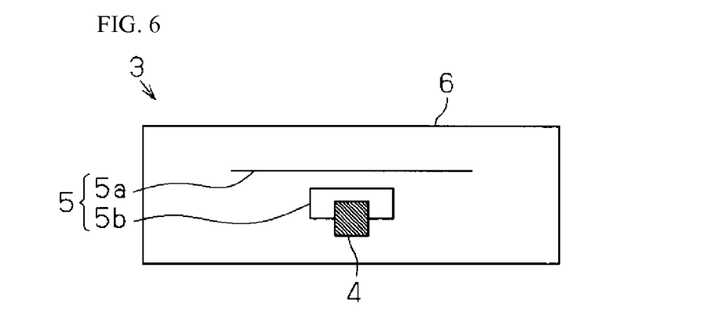
FIG. 6 is a plan view showing a modified example of a configuration of an antenna in the inlet included in the container of the first and third embodiments.

As shown in FIG. 6, when the antenna 5 functions as a dipole antenna, the radiating element 5*a* and the matching circuit 5*b* may be separated from each other in the structure. It should be noted that because the antenna 5 has a function of communication between the inlet 3 and the outside, the antenna 5 includes the radiating element 5*a*, matching circuit 5*b*, and a gap between the radiating element 5*a* and the matching circuit 5*b* that functions as a transmission path between them when the radiating element 5*a* and the matching circuit 5*b* are separated from one another in the structure. The position of the second brittle part 12 in the front face of the substrate 6 may be a site where at least one of the radiating element 5*a*, the matching circuit 5*b*, and the gap between the radiating element 5*a* and the matching circuit 5*b* is positioned on the extended line of the second brittle part 12.

Figure 7:
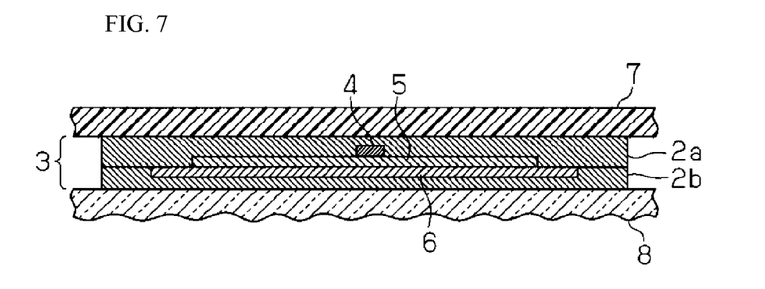
FIG. 7 is a sectional view showing a sectional structure of the container of the first embodiment.

Next, the configuration of the container will be described with reference to FIGS. 7 and 8. As shown in FIG. 7, the container includes the inlet 3, a covering film 7 and a container main body 8.

An opening that is part of the container where contents are put in and out, and is closed by a lid or plug, is formed in the container main body 8. The inlet 3 and the covering film 7 are attached to an edge portion surrounding the opening and a vicinity of the edge portion in the container main body 8, for example. The covering film 7 is a shrink film that shrinks by heat, for example, and is in close contact with an outer surface of the container main body 8 to covers the edge portion and the vicinity of the edge portion. Incidentally, the covering film 7 is not limited to a shrink film, but may be a non-conductive film that covers a part of the outer surface of the container main body 8. The shape of the container main body 8, the size of the container main body 8, and the contents accommodated in the container main body 8 are not particularly limited.

The inlet 3 is positioned between the outer surface of the container main body 8 and the covering film 7, and is adhered to a reverse face that is one of faces that the covering film 7 has and faces the outer surface of the container main body 8 via a first adhesive layer 2*a*.

Incidentally, the inlet 3 is also adhered to the outer surface of the container main body 8 via a second adhesive layer 2*b*. In the example shown in FIG. 7, among the faces that the substrate 6 of the inlet 3 has, the front face that is a face where the antenna 5 and the IC chip 4 are disposed faces the covering film 7, and the reverse face of the substrate 6 faces the container main body 8. On the contrary, the reverse face of the substrate 6 may face the covering film 7 and the front face of the substrate 6 may face the container main body 8.

Incidentally, a layer that imparts durability, a layer that imparts stability, a layer that imparts brittleness, or a protective layer may be separately added between the inlet 3 and the covering film 7, or between the inlet 3 and the container main body 8 depending on the use of the inlet 3 or the container. In addition, the second adhesive layer 2*b* may be omitted depending on the use of the inlet 3 and the container. Because the inlet 3 is adhered to the covering film 7, it is possible to support the inlet 3 between the outer surface of the container main body 8 and the covering film 7 even if it is configured that the second adhesive layer 2*b* is omitted. It should be noted that glue contained in the second adhesive layer 2*b* is suppressed from remaining on the outer surface of the container main body 8 when the covering film 7 and the inlet 3 are removed from the container main body 8 if it is configured that the second adhesive layer 2*b* is omitted.

Further, a substrate for glue such as a paper or a film may be sandwiched between the second adhesive layer 2*b* and the inlet 3, for example. The glue contained in the second adhesive layer 2*b* is suppressed from remaining on the outer surface of the container main body 8 when the covering film 7 and the inlet 3 is removed from the container main body 8 in a configuration that the substrate for glue is sandwiched Further, because the IC chip 4 or the antenna 5 is suppressed from contacting directly to the outer surface of the container main body 8 if it is configured that the substrate for glue is sandwiched and the front face of the substrate 6 faces the container main body 8, it is possible to protect the IC chip 4 or the antenna 5.

Furthermore, the inlet 3 and the covering film 7 may be attached to the container main body 8 to which the shrink film is attached, for example. In this case, the shrink film is positioned between the outer surfaces of the inlet 3 and the container main body 8.

Each adhesive layer 2*a*, 2*b* may have a layer structure of glue, adhesive substrate, and glue in this order, or may be configured only with the glue without having the adhesive substrate. Each adhesive layer 2*a*, 2*b* is formed by laminate-transferring an adhesive layer in an intermediate portion of a sheet to which epoxy or acrylic based adhesives is applied to PET-based film as an adhesive substrate and protected by a separator, for example. It is preferable that the adhesive force of each adhesive layer 2*a*, 2*b* has strength of about 2.66N/10 mm to 3.42N/10 mm at the measuring method conforming to JIS (Japanese Industrial Standard) standard (Z0237). It should be noted that a portion overlapping with the second brittle part 12 in each adhesive layer 2*a*, 2*b* may have a structure that partially weakens each adhesive layer 2*a*, 2*b* with respect to an external force such as slits or perforations.

Figure 8:
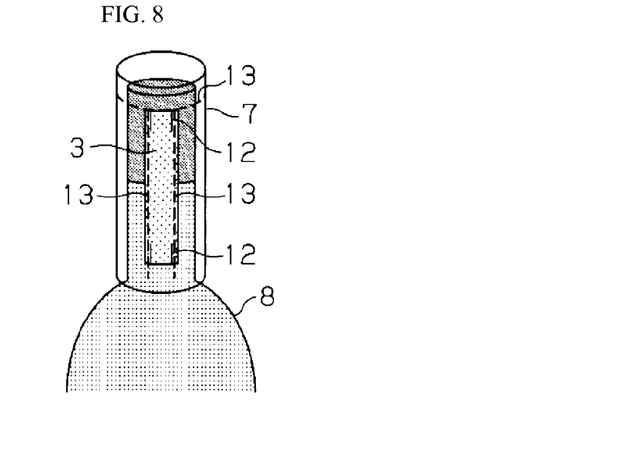
FIG. 8 is a diagram schematically showing a container main body to which a covering film and the inlet are attached in the first embodiment.

As shown in FIG. 8, first brittle parts 13 are formed in the covering film 7 for facilitating a tearing of the covering film 7 when removing the covering film 7 from the container main body 8. That is, the first brittle parts 13 are portions that easily destroyed by an external force than portions other than the brittle parts 13 in the covering film 7. The first brittle parts 13 may, for example, include linear perforations, or may have a structure that thin portions, which have the thickness of the film thinner than portions other than the first brittle part 13, are disposed continuously, or intermittently. The number of the first brittle parts 13 or the extending directions of the first brittle parts 13 are not particularly limited. For example, the first brittle parts 13 may have linear shapes, or may have curved shapes, or shapes that the first brittle parts 13 have may be a combination of the linear shapes and the curved shapes. The first brittle part 13 is formed in the covering film 7 downwardly from a portion overlapping with the opening formed partially in the container main body 8, for example.

In a condition where the covering film 7 and the inlet 3 are attached to the container main body 8, the first brittle parts 13 cover at least a part of the antenna 5.

Furthermore, the first brittle parts 13 cover at least a part of the second brittle parts 12 in the inlet 3.

For example, as shown in FIG. 6, when the antenna 5 includes the radiating element 5*a*, the matching circuit 5*b*, and, a gap between the radiating element 5*a* and the matching circuit 5*b*, the first brittle part 13 may cover at least one of the radiating element 5*a*, the matching circuit 5*b*, or the gap between the radiating element 5*a* and the matching circuit 5*b*.

In a configuration that at least a part of the first brittle parts 13 cover at least a part of the second brittle parts 12, the extending direction of the first brittle parts 13 and the extending direction of the second brittle parts 12 may be parallel to each other or may be intersected to each other, for example.

With such a configuration, when the covering film 7 is removed from the container main body 8, the covering film 7 receives an external force of peeling off the covering film 7, and is torn along the first brittle parts 13. At this time, the inlet 3 is also torn with the covering film 7. Because the first brittle parts 13 cover at least a part of the antenna 5, the antenna 5 is destroyed when the inlet 3 is torn with the covering film 7. Therefore, because the external force that is peeling off the covering film 7 is effectively used for destroying the antenna 5, the communication function of the antenna 5 can be easily destroyed. As a result, the inlet 3 is suppressed from being used for other than its intended purpose. Further, because the inlet 3 is covered with the covering film 7, it is also difficult to take out or replace only the inlet 3.

Moreover, because the first brittle parts 13 cover at least a part of the second brittle parts 12, the substrate 6 is also torn along the second brittle parts 12 when the covering film 7 is torn along the first brittle parts 13. Therefore, the inlet 3 becomes easily destroyed, and especially, because the antenna 5 is positioned on the extended lines of the second brittle parts 12, the antenna 5 becomes easily destroyed. In addition, when the substrate 6 of the inlet 3 is the paper, the inlet 3 becomes further easily destroyed.

Incidentally, in a case when the first adhesive layer 2a is disposed between the inlet 3 and the covering film 7, and the second adhesive layer 2b is disposed between the inlet 3 and the container main body 8, it is preferable that adhesive force of the second adhesive layer 2b is higher than adhesive force of the first adhesive layer 2a. In a configuration that the adhesive force of the second adhesive layer 2b close to the container main body 8 is higher than the adhesive force of the first adhesive layer 2a close to the covering film 7, the inlet 3 is easily torn compared with a configuration that the adhesive force of the second adhesive layer 2b is lower than the adhesive force of the first adhesive layer 2a.

Further, it is preferable that the container includes the container main body 8 and a lid for closing the opening formed in the container main body 8, and the inlet 3 and the covering film 7 are positioned extending over the container main body 8 and the lid. The lid may be fitted into the opening, or the edge portion surrounding the opening may be fitted to the lid. Thereby, it is possible to prevent an unauthorized act of replacing the contents of the container main body 8 by removing the lid.

Figure 9:
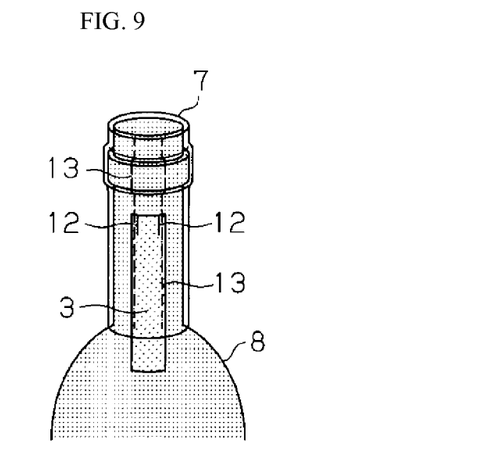
FIG. 9 is a diagram schematically showing a modified example of the container main body to which the covering film and the inlet are attached in the first embodiment.

FIG. 9 shows an example that the shrink film is used as the covering film 7, and the shrink film shrunk by heat is in close contact with the container.

As shown in FIG. 9, even when the covering film 7 is shrunk, the first brittle parts 13 in the covering film 7 cover at least a part of the second brittle parts 12 of the inlet 3, and cover at least a part of the antenna 5 positioned on the extended lines of the second brittle parts 12. A part of the inlet 3 is positioned between the covering film 7 and the outer surface of the container main body 8 and other parts of the inlet 3 are exposed from the covering film 7. In other words, the part of the antenna 5 and the IC chip 4 are covered by the covering film 7, and the other parts of the antenna 5 are not covered by the covering film 7. Thus, if only a part of the inlet 3 is sandwiched between the covering film 7 and the container main body 8, it is possible to easily destroy a communication function of the antenna 5 as well as described above even if all of the inlet 3 is not sandwiched between the covering film 7 and the container main body 8.

In the configuration that only a part of the inlet 3 is covered by the covering film 7, the first adhesive layer 2a may be disposed only at a portion between the inlet 3 and the covering film 7. In addition, other layers such as a protective layer for protecting the inlet 3 from the outside may be laminated to a part exposed from the covering film 7 in the inlet 3.

Moreover, in the embodiment described above, the antenna 5 may be communicable in a condition where the covering film 7 and the inlet 3 are attached to the container main body 8, and when in a case the antenna 5 includes a coil for electromagnetic coupling to the radiating element, for example, a part of the antenna 5 may be disposed on the reverse face of the covering film 7.

Second Embodiment

A second embodiment of the container will be described with reference to FIGS. 10-15. In the following, differences between the first embodiment and the second embodiment will be mainly described, and the same configuration as the first embodiment will be given the same reference numerals and will not be described.

Figure 10:
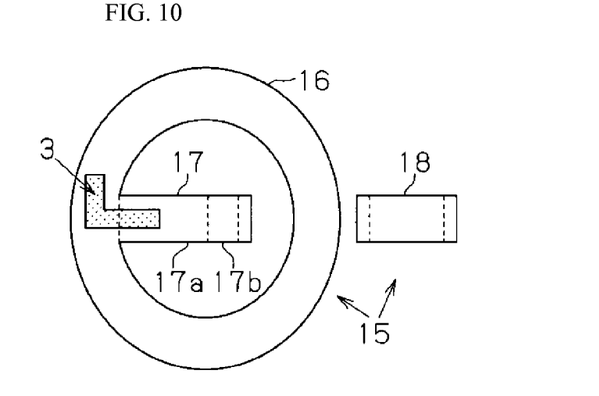
FIG. 10 is a plan view showing a planar structure of the inlet and a supporting member included in the container of the second embodiment.

As shown in FIG. 10, the inlet 3 is attached to a sheet-shaped supporting member 15 via an adhesive layer in the second embodiment. A material constituting the supporting member 15 may be a paper, a resin film, or may be a synthetic paper. Incidentally, it is preferable that the material constituting the supporting member 15 is the paper in order to increase the brittleness of the supporting member 15.

The supporting member 15 is configured by including an overhanging portion 16 having an annular shape, a projecting portion 17 extending inwardly towards inside the overhanging portion 16 from an inner periphery of the overhanging portion 16, and an accessory portion 18 separately from the overhanging portion 16 and the projecting portion 17.

An inner diameter of the overhanging portion 16 is slightly larger than an outer diameter of the edge portion of the container main body 8. In particular, when the container main body 8 has a neck portion including the edge portion and a portion extending from the edge portion like a bottle containing liquid, it is preferable that the inner diameter of the overhanging portion 16 is larger than the outer diameter of the neck portion in the container main body 8 and smaller than the outer diameter of the body portion in which the diameter is expanded from the neck portion.

When the supporting member 15 is attached to the container main body 8, the projecting portion 17 is bent at a portion to be connected to the overhanging portion 16 so that an extending direction of the projecting portion 17 is substantially parallel to a central axis of the overhanging portion 16, and the neck portion of the container main body 8 is passed through an inner side of the overhanging portion 16.

The projecting portion 17 has a main portion 17a and a sub portion 17b. In a condition where the supporting member 15 is attached to the container main body 8, an extending direction of the main portion 17a and an extending direction of the neck portion of the container main body 8 are substantially matched. In the condition where the supporting member 15 is attached to the container main body 8, the sub portion 17b is positioned above the lid or the plug fitted in the opening of the container main body 8. In the condition where the supporting member 15 is attached to the container main body 8, the neck portion is positioned between the accessory portion 18 and the main portion 17a. Then, the accessory portion 18 connects an end of the sub portion 17b and a portion in the inner periphery of the overhanging portion 16 opposing a portion where the projecting portion 17 is connected.

The inlet 3 extends over the overhang portion 16 and the projecting portion 17. The antenna 5 in the inlet 3 extends over the overhanging portion 16 and the projecting portion 17. The IC chip 4 may be positioned on the overhanging portion 16, or may be positioned on the projecting portion 17. When the substrate 6 of the inlet 3 has the second brittle parts 12, a structure that partially weakens the supporting member 15 with respect to an external force, such as slits or perforations may be formed to a part that overlaps a part of the second brittle parts 12 in the supporting member 15.

Examples of arrangements of the IC chip 4 and the antenna 5 will be described with reference to FIGS. 11-13. Incidentally, each example shown in FIGS. 11-13 is a configuration to function the antenna 5 as the dipole antenna, and the positions of the IC chip 4 and the antenna 5 are different from each other.

Figure 11:
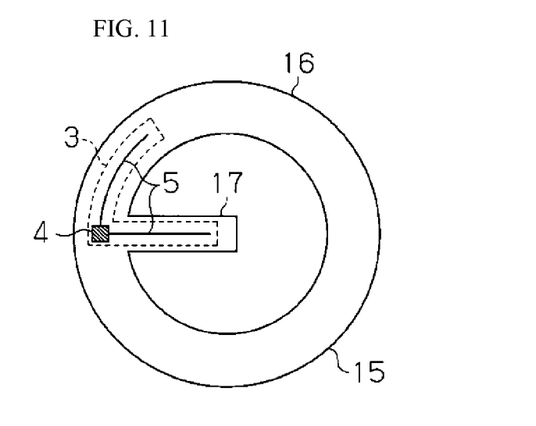
FIG. 11 is a plan view showing an example of a configuration of an antenna in the inlet included in the container of the second embodiment.

As shown in FIG. 11, the antenna 5 includes a first conductor line extending over the overhanging portion 16 from the IC chip 4 positioned in the overhanging portion 16, and a second conductor line extending over the projecting portion 17 from the IC chip 4. It should be noted that the antenna 5 may embody the first conductor line or the second conductor line in a bent line or a spiral for the purpose of extending the substantial antenna length.

Figure 12:
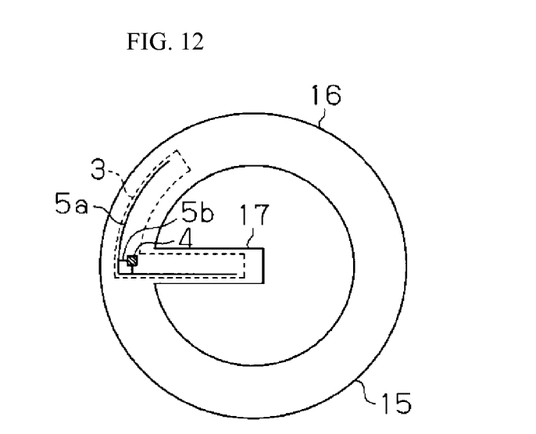
FIG. 12 is a plan view showing an example of a configuration of an antenna in the inlet included in the container of the second embodiment.

As shown in FIG. 12, the antenna 5 includes the radiating element 5a composed of a first conductor line positioned in the overhanging portion 16 and a second conductor line positioned in the projecting portion 17, and the matching circuit 5b that is a third conductor line connected to the radiating element 5a and the IC chip 4. Even in such a configuration, the antenna 5 may embody the first conductor line or the second conductor line in a bent line or a spiral for the purpose of extending the substantial antenna length.

Figure 13:
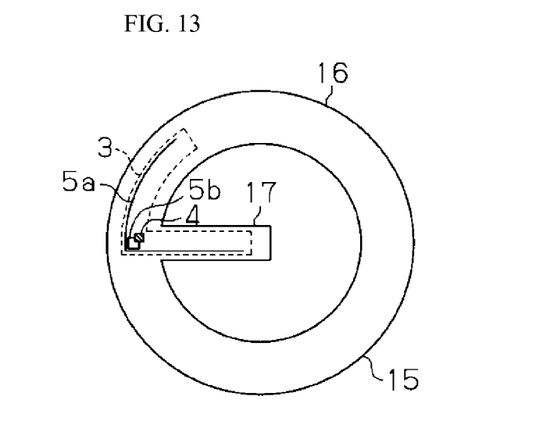
FIG. 13 is a plan view showing an example of a configuration of an antenna in the inlet included in the container of the second embodiment.

As shown in FIG. 13, the antenna 5 includes the radiating element 5a composed of a first conductor line positioned in the overhanging portion 16 and second conductor line positioned in the projecting portion 17, and the matching circuit 5b that is a third conductor line connected to the IC chip 4 but spaced apart from the radiating element 5a. Even in such a configuration, the antenna 5 may embody the first conductor line or the second conductor line in a bent line or a spiral for the purpose of extending the substantial antenna length.

A configuration of the container including the inlet 3, the supporting member 15, and the covering film 7 will be described with reference to FIGS. 14 and 15.

Figure 14:
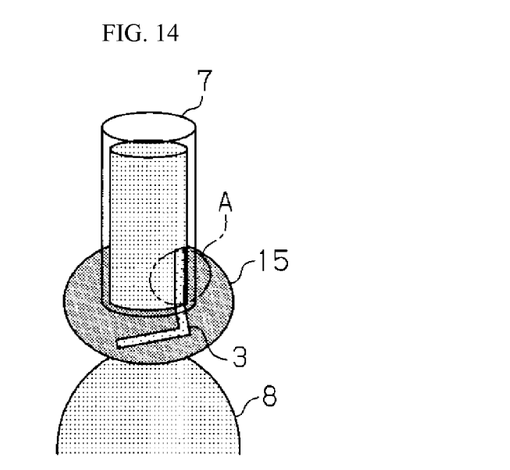
FIG. 14 is a diagram schematically showing a container main body to which a covering film and the inlet are attached in the second embodiment.

As shown in FIG. 14, the neck portion of the container main body 8 is passed through the inside of the overhanging portion 16, and the main portion 17a of the projecting portion 17 is extending toward the opening from the overhanging portion 16 along with the extending direction of the neck portion. The sub portion 17b of the projecting portion 17 is positioned above the lid or plug fitted to the opening of the container main body 8, and accessory portion 18 is facing the main portion 17a with the container main body 8 therebetween. When the contents accommodated in the container main body 8 include a liquid, it is preferred that the main portion 17a of the projecting portion 17 is positioned above a liquid level of the liquid when the container main body 8 is at rest (for example, the container main body 8 is at rest with its opening facing upward), so that it does not face the liquid through the container main body 8.

The covering film 7 covers a surrounding of the neck portion in the container main body 8, the projecting portion 17 in the supporting member 15, and the accessory portion 18 in the supporting member 15. The projecting portion 17 of the supporting member 15 and a portion positioned to the projecting portion 17 in the inlet 3 are sandwiched between the outer surface of the container main body 8 and the covering film 7. The overhang portion 16 of the supporting member 15 overhangs from the outer surface of the container main body 8 along a direction intersecting the outer surface of the container main body 8. A portion positioned onto the overhang portion 16 in the inlet 3 is spaced apart from the outer surface of the container main body 8.

A portion covered by the covering film 7 in the inlet 3 is adhered via the adhesive layer and the covering film 7. The projecting portion 17 of the supporting member 15 may be adhered via the container main body 8 and the adhesive layer, or the projecting portion 17 may not be adhered to the container main body 8 as long as the inlet 3 and the projecting portion 17 are held in a gap between the container main body 8 and the covering film 7.

Figure 15:
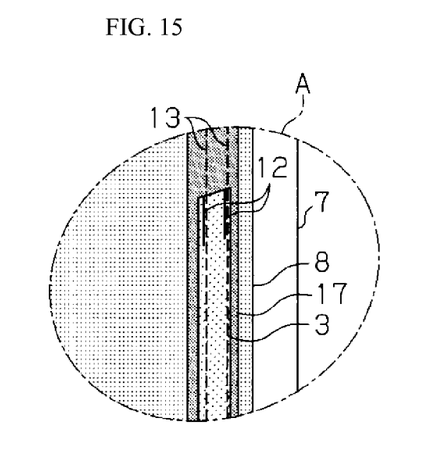
FIG. 15 is a diagram schematically showing a container main body to which a covering film and the inlet are attached in the second embodiment, and is a diagram showing an enlarged portion indicated by A in FIG. 14.

As shown in FIG. 15, in the condition where the inlet 3, the supporting member 15, and the covering film 7 are attached to the container main body 8, the first brittle parts 13 in the covering film 7 cover at least a part of the antenna 5 positioned in the projecting portion 17. Furthermore, the first brittle parts 13 in the covering film 7 cover at least a part of the second brittle parts 12 in the inlet 3.

With such a configuration, when the covering film 7 is removed from the container main body 8, the covering film 7 receives an external force of peeling off the covering film 7, and is torn along the first brittle parts 13. At this time, the inlet 3, or the inlet 3 and the supporting member 15 are also torn with the covering film 7. Because the first brittle parts 13 cover at least a part of the antenna 5, the antenna 5 is destroyed when the inlet 3 is torn with the covering film 7.

Because the communication of the RFID tag uses electromagnetic waves, the communication of the RFID tag is inhibited when a metal or moisture is positioned close to the antenna 5. In terms of suppressing the inhibition of such communication, the inlet 3 preferably does not face the liquid through the container main body 8. However, because a range that does not face the liquid is limited in the outer surface of the container main body 8, the antenna length of the antenna 5 is significantly restricted premising that the inlet 3 and the fluid do not face each other. In this respect, according to the second embodiment, because the part of the antenna 5 is positioned in the overhanging portion 16 disposed away from the container main body 8, the communication is suppressed from being inhibited by the liquid, and it is possible to reduce restriction to the antenna length.

In particular, when the main portion 17a is positioned above the liquid level when the container main body 8 is at rest, a portion positioned in the main portion 17a in the inlet 3, that is, a portion positioned between the covering film 7 and the outer surface of the container main body 8 in the inlet 3 is also positioned above a position of the liquid level. Therefore, because none of the whole inlet 3 faces the liquid, the communication is further suppressed from being inhibited by the liquid.

Incidentally, the overhanging portion 16 of the supporting member 15 may be any shape having a hole where the neck portion of the container main body 8 passes through, the overhanging portion 16 may have an elliptical ring or rectangular ring. Further, a single overhanging portion 16 having a ring shape may be configured by joining two or more members. Furthermore, the overhanging portion 16 may also function as a seller disk. Furthermore, the protruding portions 17 of the supporting member 15 may have only a main portion 17a and the sub portion 17b may be omitted and further, the accessory portion 18 may be omitted.

Moreover, the antenna 5 may be formed in the supporting member 15 directly and the IC chip 4 may be mounted directly to the supporting member 15. In this case, the supporting member 15 functions as a substrate of the inlet 3, and the supporting member 15 is included in components of the inlet 3. In short, the configuration is sufficient that a part of the antenna 5 is supported by the supporting member 15 in a condition of being included in the inlet 3, or the configuration is sufficient that a part of the antenna 5 is supported directly on the supporting member 15.

Third Embodiment

A third embodiment of the container will be described with reference to FIGS. 16 and 17. In the following, differences between the first embodiment and the third embodiment will be mainly described, and the same configuration as the first embodiment will be given the same reference numerals and will not be described.

Figure 16:
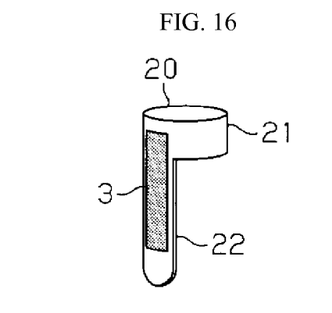
FIG. 16 is a perspective view showing a configuration of the inlet and a buffer member included in the container of the third embodiment.
Figure 17:
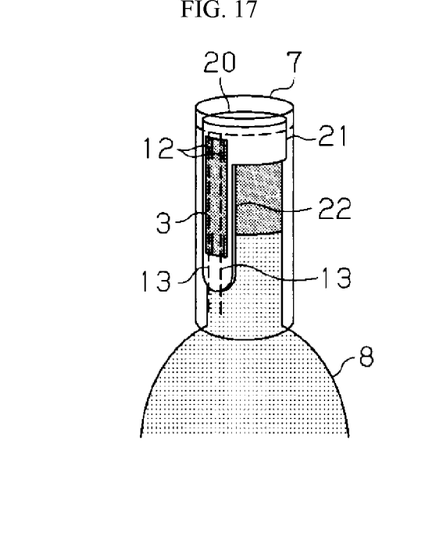
FIG. 17 is a diagram schematically showing a container main body to which a covering film and the inlet are attached in the third embodiment.

As shown in FIG. 16, in the third embodiment, the inlet 3 is attached to a non-conductive buffer member 20 through an adhesive layer.

The buffer member 20 includes a cap portion 21 to which the edge portion of the container main body 8 is fitted, and a extending portion 22 extending downwardly from the cap portion 21. In a condition where the buffer member 20 is attached to the container main body 8, the extending portion 22 is positioned along the outer surface of the neck portion of the container main body 8. The inlet 3 is fixed to the extending portion 22.

The configuration of the container including the inlet 3, the buffer member 20, and the covering film 7 will be described with reference to FIG. 17.

As described above, the edge portion surrounding the opening of the container main body 8 is fitted to the cap portion 21 of the buffer member 20, whereby the buffer member 20 is attached to the container main body 8. At this time, the extending portion 22 is disposed along the outer surface of the neck portion of the container main body 8. Incidentally, in the circumferential direction of the outer surface of the container main body 8, the extending portion 22 may face to a part of the outer surface, or may surround the outer surface entirely.

In a condition where the inlet 3 and the buffer member 20 are attached, the inlet 3 adhered to the outer surface of the container main body 8 and the extending portion 22 are separated by an amount equivalent to the thickness of the extending portion 22. The thickness of the extending portion 22, i.e., a distance between the outer surface of the container main body 8 and the inlet 3 is preferably 0.1 mm or more and 20 mm or less, or more preferably, not less than 1 mm and 5 mm or less. When the distance between the outer surface of the container main body 8 and the inlet 3 is within the range mentioned above, when the content of the container main body 8 is a liquid, the communication is suppressed from being inhibited by the liquid properly, and a structure of a vicinity of the opening of the container main body 8 does not become too large. It should be noted that a gap is formed between the extending portion 22 and the outer surface of the container main body 8, and a combined length of the gap and the thickness of the extending portion 22 may be the distance between the outer surface of the container main body 8 and the inlet 3.

The covering film 7 covers the neck portion of the container main body 8 and the buffer member 20 to which the inlet 3 is stuck. A part of the inlet 3 and the buffer member 20 may be exposed from the covering film 7. The inlet 3 and the covering film 7 are adhered via an adhesive layer. The first brittle parts 13 in the covering film 7 cover at least a part of the antenna 5 in the inlet 3. Furthermore, the first brittle parts 13 in the covering film 7 cover at least a part of the second brittle parts 12 in the inlet 3.

With such a configuration, when the covering film 7 is removed from the container main body 8, the covering film 7 receives an external force of peeling off the covering film 7, and is torn along the first brittle parts 13. At this time, the inlet 3 is also torn with the covering film 7. Because the first brittle parts 13 cover at least a part of the antenna 5, the antenna 5 is destroyed when the inlet 3 is torn with the covering film 7. After the covering film 7 is removed, glue contained in the adhesive layer does not remain on the outer surface of the container main body 8 by removing the buffer member 20.

In the third embodiment, as compared with a configuration in which the buffer member 20 is not provided, the outer surface and the inlet 3 of the container main body 8 are separated. Therefore, even when the content of the container main body 8 is a liquid, the communication is suppressed from being inhibited by the liquid. Further, even when the container main body 8, or the lid or the plug that closes the opening of the container main body 8 is made of metal, because the outer surface of the container main body 8 and the inlet 3 are separated, the communication is also suppressed from being inhibited by metallic members.

In addition, by the edge portion of the container main body 8 is fitted into the buffer member 20, because the buffer member 20 is attached to the container main body 8, the attachment of the buffer member 20 to the container main body 8 is also easy. Incidentally, the attachment of the buffer member 20 to the container main body 8 is not limited to the above embodiment, and for example, the buffer member 20 may be attached to the container main body 8 so as to sandwich the container main body 8, or parts other than the edge portion of the container main body 8 may be fitted to the buffer member 20.

EXAMPLES

A container having the configuration of the first embodiment is prepared as an example, and a verification experiment of brittle effects is conducted. In the example, the inlet 3 includes the antenna 5 and the IC chip 4 on the substrate 6, and the inlet 3 is positioned between the covering film 7 and the outer surface of the container main body 8. The front face of the inlet 3 is adhered to the covering film 7 by the first adhesive layer 2a, and the reverse face of the inlet 3 is adhered to the outer surface of the container main body 8 by the second adhesive layer 2b.

Example 1

Preparation of the Inlet

A fine paper is used as the substrate 6 of the inlet 3 by screen printing, using a silver-based conductive paste, and the conductor line as the UHF band antenna 5 is formed on the front face of the fine paper, while the conductor line that becomes the jumper wire 11 is formed on the reverse face of the fine paper. Then, the front face of the fine paper and the reverse face of fine paper are connected via through holes. Further, a UHF band conformity product (EPC global Class-1 Generation-2) is used as the IC chip 4, and is connected to a connection pad by an anisotropic conductive paste. The outer shape of the inlet is 10 mm×50 mm.

Attachment of the Inlet

As the container main body 8, a wine bottle is used as an unopened article that is sealed with a cork. As the covering film 7, a shrink film made of polystyrene having a thickness of 100 μm is used.

To form the first adhesive layer 2a that contacts with the shrink film, an adhesive film made of a release paper having a thickness of 50 μm, an acrylic adhesive layer including adhesive substrate and having a thickness of 20 μm, and a release paper having a thickness of 50 μm in this order is used. The adhesive film described above is also used for the formation of the second adhesive layer 2b that contacts with the wine bottle.

Then, the first adhesive layer 2a is formed on the front face that is a surface on which the IC chip is positioned on the fine paper by the adhesive film where one of the release papers is peeled off. In addition, the second adhesive layer 2b is formed on the reverse face of the fine paper by the adhesive film where one of the release papers is peeled off.

Then, the inlet is adhered in the vicinity of the edge portion of the wine bottle where the cork is plugged by peeling the other one of the release papers of the second adhesive layer 2b.

Next, the other one of the releasing papers of the first adhesive layer 2a is peeled off, and the inlet is covered by the shrink film so that the perforation formed in the shrink film and the inlet overlap. Then, the wine bottle, the inlet, and the shrink film are temporarily held by light pressing, and by hot air being applied to the shrink film, the shrink film shrinks, and the whole article is sealed. As a result, the container of the first example having the inlet is obtained.

Example 2

A container of a second example having an inlet is obtained by using an adhesive film having no adhesive substrate as the second adhesive layer 2b that contacts with the wine bottle and the other configurations are configured to be in the same manner as in Example 1.

Example 3

A container of a third example having an inlet is obtained by using an adhesive film having no adhesive substrate as the first adhesive layer 2a that contacts with the shrink film and the other configurations are configured to be in the same manner as in Example 1.

Example 4

A container of a fourth example having an inlet is obtained by using an adhesive film having no adhesive substrate as the first adhesive layer 2a that contacts with the shrink film, the second adhesive layer 2b that contacts with the wine bottle, and the other configurations are configured to be in the same manner as in Example 1.

Experimental Results

For Examples 1-4, a condition of destruction of the inlet when the shrink film is peeled off, and an adhesion condition of the adhesive layer to the wine bottle are verified. For the adhesion condition of the adhesive layer to the wine bottle, in order not to impair the appearance of the wine bottle after the shrink film is removed and the inlet is destroyed, the appearance of the wine bottle when trying to remove the destroyed inlet is observed. Results are shown in Table 1. In Table 1, "no substrate" indicates that the adhesive layer used is the adhesive layer of the type without adhesive substrate, and "substrate present" indicates that the adhesive layer used is the adhesive layer of the type with the adhesive substrate.

TABLE 1

| Example | The inlet adhesive | | Brittle effects (inlet destruction) | Adhesive remaining at the peeling from the bottle |
| --- | --- | --- | --- | --- |
| | Front face (2a) | Reverse face (2b) | | |
| 1 | Substrate present | Substrate present | Partially destroyed | Yes |
| 2 | Substrate present | No substrate | Partially destroyed | None |
| 3 | No substrate | Substrate present | Destroyed | Yes |
| 4 | No substrate | No substrate | Destroyed | None |

By comparing the results of the brittle effect of Examples 1, 2 and Examples 3, 4, it has been shown that, when the adhesive layer (the first adhesive layer 2a) that contacts with the shrink film is of the type without adhesive substrate, it has high brittle effect. This is considered to be perhaps because the adhesive substrate protects the entire inlet. Meanwhile, it is considered that when there is no adhesive substrate, and the adhesive layer is adhered to the shrink film, the substrate of the inlet follows the destruction of the shrink film.

For the adhesive layer that remains when peeling off the shrink film from the wine bottle, although a difference is caused between Examples 1, 3 and Examples 2, 4, this difference is a difference whether there is an adhesive substrate in the adhesive layer (second adhesive layer 2b) that contacts with the wine bottle. Although it is not directly related to the brittle effect, because the appearance and workability are high when the shrink film is removed if the adhesive layer between the wine bottle and the inlet is of the type without adhesive substrate, it is recommended that the adhesive layer disposed to the reverse face of the substrate inlet to be the type without adhesive substrate.

As a conclusion, the configuration of covering the right and reverse faces of the inlet by the adhesive layer and interposing the inlet between the container and the shrink film so as to adhere the inlet to the container and the covering film is validated.

DESCRIPTION OF REFERENCE NUMERALS 1a, 1b . . . protective sheet, 2a . . . first adhesive layer, 2b . . . second adhesive layer, 3 . . . inlet, 4 . . . IC chip, 5 . . . antenna, 5a . . . radiating element, 5b . . . matching circuit, 6 . . . substrate, 7 . . . covering film, 8 . . . container main body, 11 . . . jumper wire, 12 . . . second brittle part, 13 . . . first brittle part, 15 . . . supporting member, 16 . . . overhanging portion, 17 . . . projecting portion, 17a . . . the main portion, 17b . . . sub portion, 18 . . . accessory portion, 20 . . . buffer member, 21 . . . cap portion, 22 . . . extending portion.

What is claimed is:

1. A container comprising:
    a container main body;
    an inlet having an IC chip supported by a substrate and an antenna supported by the substrate; and
    a covering film that covers a part of an outer surface of the container main body and has a first brittle part, the first brittle part being more easily torn by an external force than parts other than the first brittle part in the covering film, at least a part of the inlet is positioned between the covering film and the outer surface of the container main body and adhered to the covering film, and the first brittle part covers at least a part of the antenna,
    wherein the substrate includes a second brittle part and the second brittle part is more easily torn by an external force compared to parts other than the second brittle part in the substrate, and
    wherein the first brittle part covers at least a part of the second brittle part.

2. The container according to claim 1,
    further comprising a lid for closing an opening formed in the container main body, and
    wherein the inlet and the covering film are positioned extending over the outer surface of the container main body and the lid.

3. The container according to claim 1, wherein,
    the substrate is a paper.

4. The container according to claim 1,
    further comprising a supporting member that supports the antenna; and
    wherein the supporting member has an overhanging portion overhanging from the outer surface of the container main body along a direction intersecting the outer surface of the container main body, and includes the overhanging portion as a portion for supporting the antenna.

5. The container according to claim 4, wherein,
    the container main body accommodates a content including a liquid; and
    a portion within the inlet positioned between the covering film and the outer surface of the container main body is positioned above a liquid level of the liquid when the container main body is at rest.

6. The container according to claim 1, wherein,
    the container includes a buffer member attached to the container main body that has a portion positioned between the outer surface of the container main body and the inlet.

7. The container according to claim 6, wherein,
    the container main body has an edge portion surrounding the opening formed in the container main body, and the edge portion is fitted to the buffer member.

* * * * *